Feb. 14, 1967  R. E. SCHOLES  3,303,871
ELECTRO-MECHANICAL SELF-POWERED HATCH COVER
Filed Nov. 12, 1964  3 Sheets-Sheet 1

INVENTOR.
RICHARD E. SCHOLES
BY
Schuman, Kramer & Steiger
ATTORNEYS.

Feb. 14, 1967          R. E. SCHOLES          3,303,871
ELECTRO-MECHANICAL SELF-POWERED HATCH COVER
Filed Nov. 12, 1964                3 Sheets-Sheet 2

INVENTOR.
RICHARD E. SCHOLES
BY
Schramm, Kramer & Stenger
ATTORNEYS.

Feb. 14, 1967   R. E. SCHOLES   3,303,871
ELECTRO-MECHANICAL SELF-POWERED HATCH COVER
Filed Nov. 12, 1964   3 Sheets-Sheet 3

INVENTOR.
RICHARD E. SCHOLES
BY
Schramm, Kramer & Stenger
ATTORNEYS.

United States Patent Office 3,303,871
Patented Feb. 14, 1967

3,303,871
ELECTRO-MECHANICAL SELF-POWERED HATCH COVER
Richard E. Scholes, East Northport, N.Y., assignor, by mesne assignments, to Pneumo Dynamics Corporation, Cleveland, Ohio, a corporation of Delaware
Filed Nov. 12, 1964, Ser. No. 410,543
3 Claims. (Cl. 160—188)

This invention relates, as indicated, to power actuated closures and more particularly to improved electrically actuated mechanically operated self-opening and closing closures especially useful as closures for ship's hatches.

Many hatch covers in use today, are operated by cumbersome pulley systems or systems which require outside help, e.g., a small boom or ship's boom, to fold the hatch cover and remove it from the hatch to permit removal of the ship's cargo from the hold. Other hatch covers employ a hydraulic system which while effective, is expensive to fabricate and maintain. Break down in such systems seriously impairs the ability to load and unload the cargo from the ship.

The present invention provides a hatch cover which is simply operated and economically manufactured. The operating parts are relatively few and simply designed, making their maintenance and repair a relatively simple operation.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Briefly stated this invention is in an electro-mechanical self-powered folding closure for covering an opening. The closure is composed of a plurality of panels which are hinged together, and which are pivotally hinged together above the opening for relative rotation about the hinge axis between closed and open positions approximately 180° of relative rotation. The hinges which hold the panels together, are designed so that when mechanical force is applied, the hinge will cause the panels to tent relative to the opening. This tenting action causes one panel to fold against the other panel, whereby the panels are removed to one edge of the opening. Also provided is a screw jack which is pivotally mounted within one of the panels for exerting mechanical force against the hinges as will be described hereafter.

The following description of the folding closure is given in reference to a hatch cover for covering a hatch or opening in a deck of a ship, e.g., a weather deck or an intermediate deck, or "tween deck."

Figure 1:
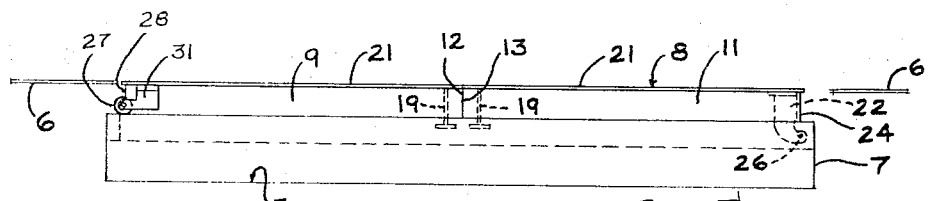
FIG. 1 is a side view of a pair of hatch cover panels including an embodiment of this invention, showing in particular the two panels in a closed position over a hatch coaming surrounding an opening in the deck of a ship.
Figure 2:
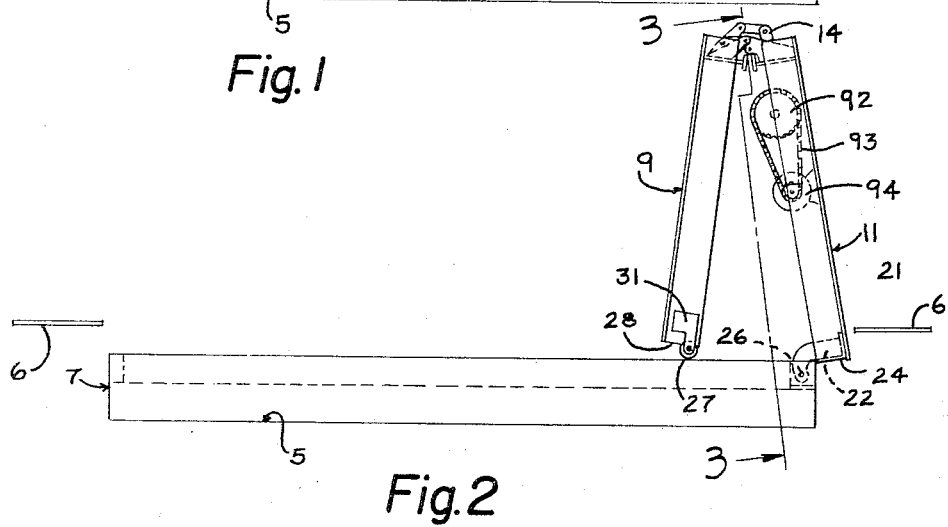
FIG. 2 is a side view of the embodiment seen in FIG. 1 showing the two panels in an open position.
Figure 3:
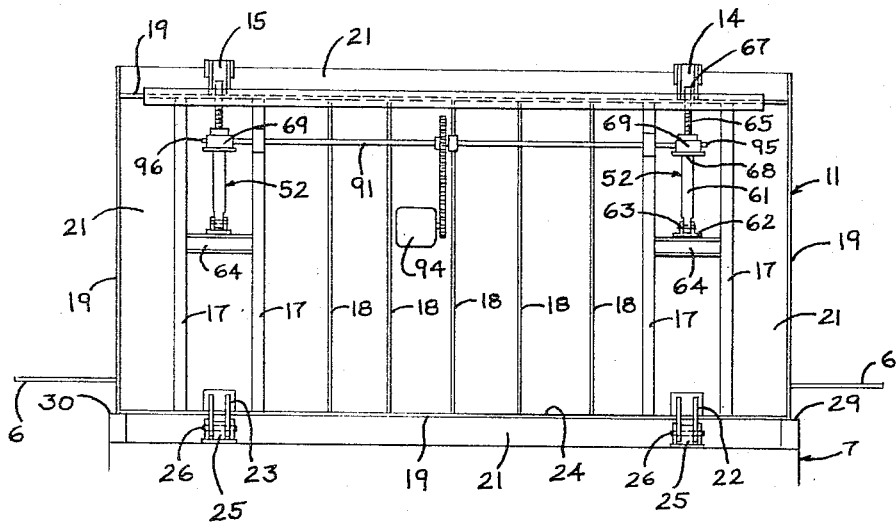
FIG. 3 is a bottom view of one of the panels as seen from the plane indicated by the line 3—3 of FIG. 2.
Figure 4:
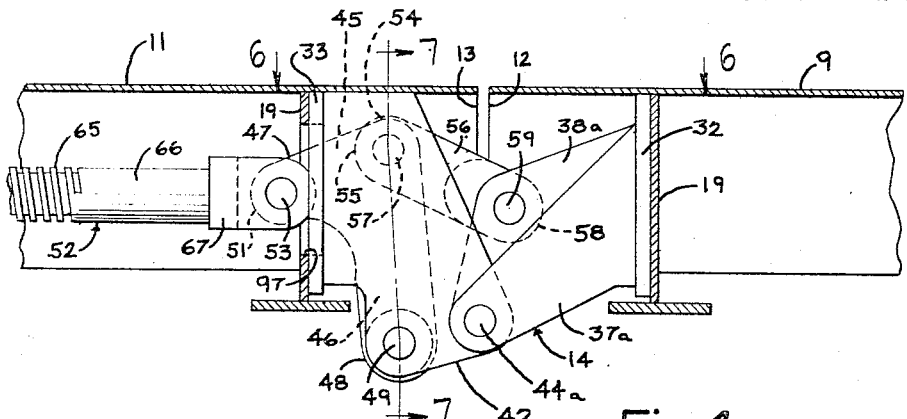
FIG. 4 is an enlarged fragmentary cross-sectional view showing a hinge structure connecting the two panels when the panels are in a closed position.
Figure 5:
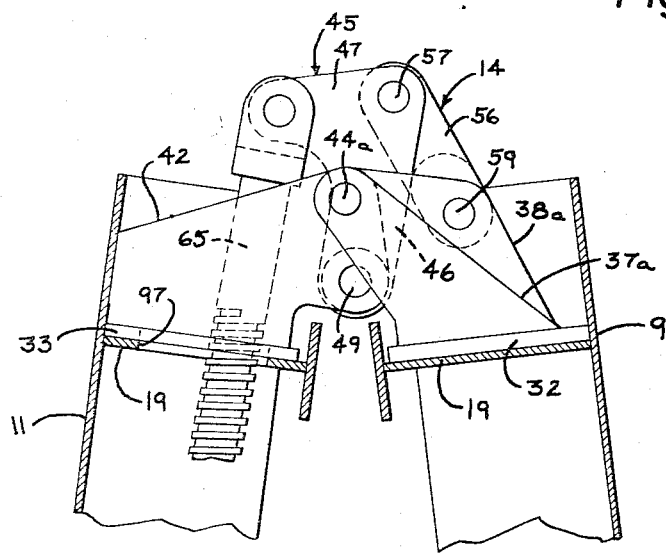
FIG. 5 is a fragmentary cross-sectional view of the hinge of FIG. 4 when the panels are in an open position.
Figure 6:
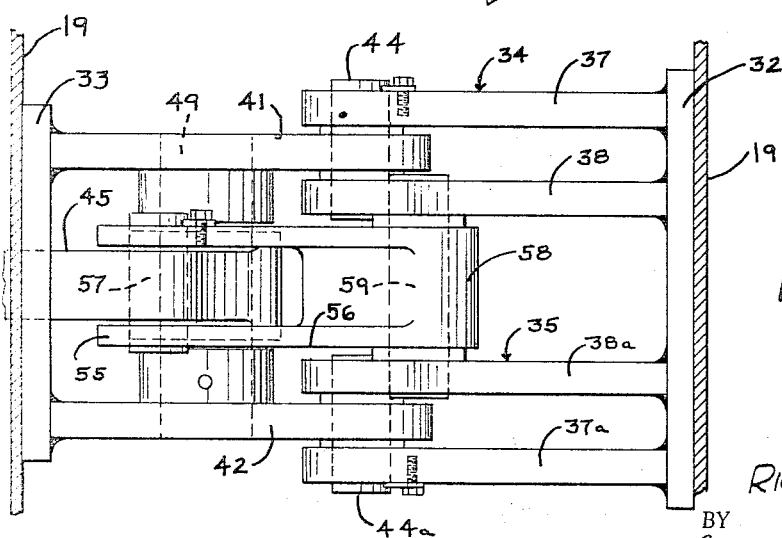
FIG. 6 is a top view of the hinge assembly as seen from the plane indicated by the line 6—6 of FIG. 4, with hatch cover plates removed.
Figure 7:
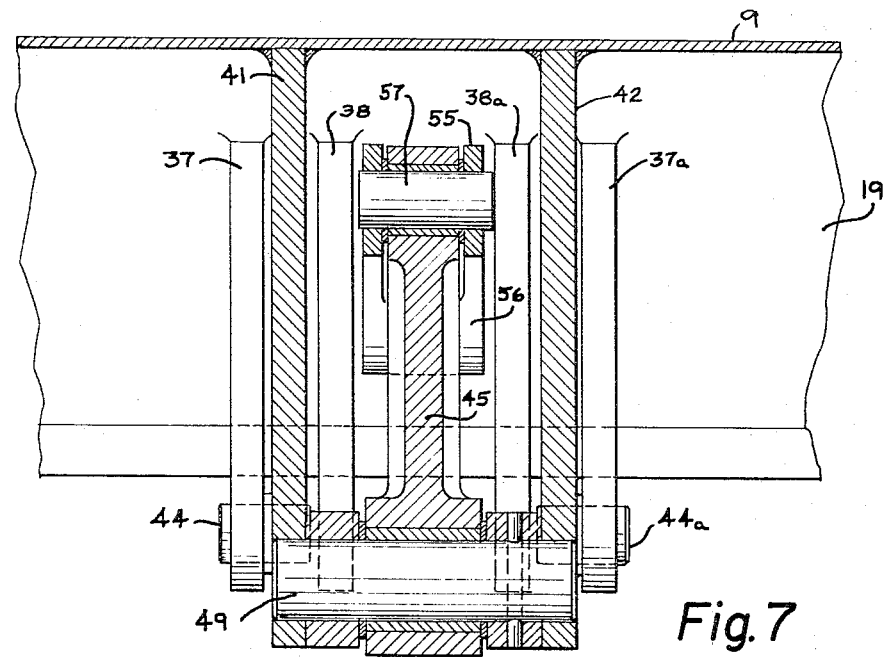
FIG. 7 is a cross-sectional view of the hinge taken in the plane indicated by the line 7—7 of FIG. 4.

Referring generally to FIGS. 1-8, and more particularly to FIGS. 1-3, there is shown an opening or hatchway 5 in a deck 6. Generally, a hatch coaming, or frame, indicated at 7, surrounding the opening 5.

A folding closure or hatch cover 8 is pivotally mounted over the hatch coaming 7 and closes the opening 5. The hatch cover 8, in this particular embodiment, is formed from a pair of panels 9 and 11, which are hinged together along their normally abutting marginal edges 12 and 13 respectively, by any suitable hinge means, e.g., hinges 14 and 15.

The cover panels 9 and 11 are box constructed from conventionally designed structural members. For example, panel 11 (FIG. 3) is formed from pairs of parallel spaced supporting members 17 adjacent each side of the panel 11, and intermediate parallel spaced ribs 18. The support members 17 and the ribs 18 are enclosed by marginal members 19 to form the panel framework. The top of the framework is covered with a cover plate 21, e.g., a steel plate. The entire opening may be closed with a pair of foldable panels, or only a portion thereof may be covered by a pair. Thus, in a usual installation, pairs of oppositely opening panels totalling four panels may be used to completely cover an opening.

As previously indicated, the hatch cover 18 is pivotally mounted above the hatch coaming 7. In this particular embodiment, a pair of offset hinges 22 and 23 are secured to the free marginal edge 24 of the panel 11. The hinges 22 and 23 are pivotally mounted to similar spaced brackets 25 secured to the hatch coaming 7, or the ship's framework by any suitable means, e.g., pivot pins 26.

A pair of wheels, e.g., wheels 27, are mounted to the free marginal edge 28 on each side of the panel 9, and extend beyond the marginal edge 28, for rolling support of the hatch cover 8 along the side rails 29 and 30 respectively, of the hatch coaming 7, or hatch frame as the panel 9 is folded against the panel 11. The wheels 27 are mounted to the panel 9 by any suitable means, e.g. brackets 31.

As previously indicated the panels 9 and 11 are hinged together by a pair of hinges 14 and 15. The hinges may be of any suitable design, the criterion being that when force is exerted upon the hinge, the hinge will fold causing the panels to tent above the opening or hatch coaming 7. As both the illustrated hinges are identical the description will be in respect to hinge 14.

Referring particularly to FIGS. 4-7, the hinge 14 is composed of opposed hinge plates 32 and 33 which are secured to marginal members 19 of panels 9 and 11, respectively.

The plate 32 supports two pairs of hinge members, generally indicated at 34 and 35, which are welded or otherwise suitably secured thereto, in spaced relation to each other. The hinge member 34 is composed of two hinge plates 37 and 38 which are welded to the plate 32 in spaced relation. The hinge member 35 is composed of identical plates 37a and 38a welded to the plate 32 in spaced relation.

The hinge plate 33 supports a pair of opposite hinge members 41 and 42 in spaced relation to be disposed between the confronting pairs of hinge plates 37, 38 and 37a, 38a, respectively. The free end of the member 41 is pivotally secured between hinge plates 37 and 38 by any suitable pivot means, e.g., pivot pin 44. The free end of member 42 is similarly pivotally secured between hinge plates 37a and 38a, by similar pivot means, e.g., pivot pin 44a.

A lever arm 45 is pivotally mounted to the hinge 14. The lever arm 45 is substantially L-shaped, and includes arms 46 and 47 and is bored and bushed at each extremity and at the apex for receiving a pivot pin. The end 48 of the arm 46, is pivotally secured between hinge members 41 and 42 adjacent pivot pins 44 and 44a by any suitable pivoting means, e.g., pivot pin 49. The end 51 of arm 47 is engaged by a clevis 67 pinned thereto by pivot pin 53. Clevis 67 is secured to the free end of an extensible arm 65 of pack screw 52.

The apex 54 formed by the intersection of arms 46 and 47, is pivotally secured between a bifurcated end 55 of a link 56 by any suitable pivot means, e.g., pivot pin 57. The other end 58 of link 56 is pivotally secured between hinge plates 38 and 38a above and beyond the axis of pivot pins 44 and 44a by any suitable pivoting means, e.g., pivot pin 59.

As the pack screw 52 exerts force on the lever arm 45, the lever arm 45, which is pivotally secured to the link 56, will rotate about the pivot pin 59. This action causes the L-shaped link 45, which is pivotally secured within the hinge members 41 and 42, to exert an upward force against hinge plate 33 which in turn causes the hinge 14 to break on the axis of pins 44 and 44a and the panels 9 and 11 to tent in a direction above the hatch coaming 7.

When the jack screw 52 relieves the force on the lever arm 45 or exerts force against it in an opposite direction, the link arm 45 will rotate about the pivot pin 59 in an opposite direction which exerts downward pressure or force against hinge plate 33, which causes the panels to close the hatch coaming 7. In essence the linkage system disposed between confronting marginal edges of the panels constitutes a toggle joint the middle arm of which is fulcrummed from the marginal edge of one panel, preferably below the hinge axis (axis of pins 44 and 44a) and which is driven at the end of a side arm 45 and having the third arm 56 attached pivotally to the other marginal edge. This system while conveniently located in a hinge, may be disposed at any one or more points along the confronting marginal edges of the panels.

Figure 8:
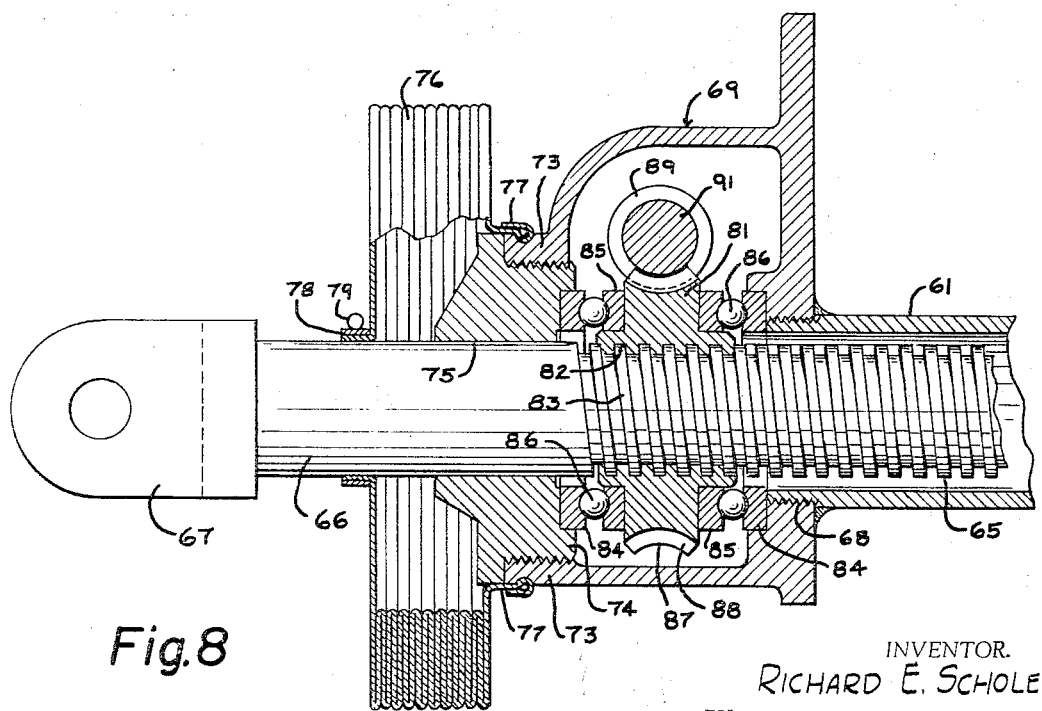
FIG. 8 is a fragmentary cross-sectional view of a screw jack useful in operating the covers and which is secured to the hinge and exerts pressure thereagainst, causing the panels to tent.

Referring more particularly to FIGS. 3 and 8, jack screws 52 are used to exert operating force against each of hinges 14 and 15, respectively. The jack screw 52 has a cylinder or compression tube 61, which has one end pivotally mounted to a bracket 62 by any suitable pivoting means, e.g., pivot pin 63. The brackets 62 are secured to a cross member 64 which is disposed between support beams 17.

An extensible screw 65 is movable in the cylinder 61. The screw 65, preferably, is provided with an Acme screw thread 83 machined therein, which because of its inefficiency as a thread is self-locking under compression, a highly desirable effect as will hereinafter be more fully explained. The screw 65 has an end 66 protruding from the cylinder 61.

A clevis 67 is secured to the end 66 of the screw 65. Clevis 67 is pivotally secured to the end 51 of the lever arm 47 by the pivot pin 53.

The free end 68 of the cylinder 61 is threaded and has secured or mounted thereto, a hollow casing or housing 69.

The opposing housing end 73 is open and has threadedly secured thereto, a cap 74 having a bore 75 extending therethrough. The screw 65 is reciprocable in the bore 75.

An expandable bellows 76, surrounds the screw 65, having one end 77 secured to the adjacent housing end 73 by any suitable clamping means, and its opposing end 78 clamped to the screw 66 adjacent the head 67, by any suitable clamping means, e.g., clamp 79. As the clevis 67 is moved to and from the housing 69 to exert pressure against the hinges, the expandable bellows 76 protects the screw 65 to keep material from fouling its threads.

A drive nut 81, mounted for rotation about the screw 65 in a fixed plane within the hollow casing 69, coacts with the screw 65 to extend or retract the head 67 into and out of the housing 69. The drive nut 81 has an externally threaded bore 82 extending therethrough, the threads of which, drivingly coact with the Acme screw threads 83 of the screw 65, as the drive nut 81 is caused to rotate about the screw 65. As previously indicated, the rotating drive nut 81 is fixedly held within the housing 69 relative to the screw 65 by any suitable means, e.g., opposing disc blocks 84 and 85 with ball bearings 86 therebetween, coacting between the drive nut 81 and the housing 69, and between the drive nut 81 and the cap 74.

The outer circumference 87 of the drive nut 81, has a plurality of gear teeth, e.g., tooth 88, disposed therearound for driving coaction with worm drive 89, formed on rotating drive shaft 91, which extends transversely through the housing 69.

The shaft 91 is rotated by any suitable means, e.g., sprocket 92 mounted on the shaft 91 intermediate its ends, and driven by a chain 93 which in turn is driven by a smaller sprocket on the shaft of electric motor 94. The ends 95 and 96 of the rotating drive shaft 91 (FIG. 3) extend beyond the housings 69. In case of an electric power failure, an air motor may be attached to the exposed ends 95 and 96 for coaction therewith to rotate the shaft 91 and thus operate the hatch covers.

Although the actuator and rotating mechanism is illustrated as being secured within the panel 11, which is hinged to the hatch coaming 7, such mechanisms may be secured within the panel not hinged to the hatch coaming, providing the toggle linkages are reversed so that when pressures are exerted against the hinge, the hinge will break causing the panels to tent above the hatch coaming or opening.

In operation, the drive shaft 91 is caused to rotate by energizing electric motor 94. The drive shaft 91 coacts with the drive nut 81 to rotate it about the screw 65. As the drive nut 81 is fixed within the housing 69 and therefore rotates in a fixed plane, the coaction between the internal threads of the drive nut 81 and the external threads on the screw 65, causes the screw 65 to move in the cylinder 61, and the jack screw head or clevis 67 to move to and from the housing 69. As the clevis 67 moves from the housing 69, it exerts pressure against the lever arm of the toggle linkage causing the hinge to break and the panels to tent above the hatch coaming or opening.

Although in its open position the hatch cover exerts an opposing force against the screw 65, which might cause the drive shaft 91 to rotate in an opposite direction, the inefficiency of the Acme screw thread causes the screw 65 to become locked in the drive nut 81 when the latter is stationary, and the drive shaft 91 will not rotate in an opposite direction, unless the motor itself is reversed and the drive shaft 91 deliberately rotated in the opposite direction.

When the drive shaft 91 is rotated in the opposite direction, and the force is relieved from the hinges or force is exerted against the lever arm in an opposite direction, the panels will unfold into a closed position over the hatch coaming or opening.

Since the jacks screws 52 and their rotating mechanisms, are preferably secured within the panels, a slot 97 (FIGS. 4 and 5) must be placed in the marginal member 19 adjacent each operating hinge in the panel where the jack screws are located. The slot 97 must also extend through the adjacent hinge plates 33, which support the hinge. This is done to permit the screw 65 to pass freely through the member 19 to exert pressure against the operating hinge.

Thus there has been provided a folding closure which is simply operated and economically manufactured. The operating parts are relatively few and easily maintained.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. An electro-mechanical self-powered folding cover for a ship hatchway comprising a pair of panels disposed in side-by-side relation and dimensioned to cover at least a portion of the hatchway, first hinge means coacting between the confronting marginal edges of said panels for relative rotation about the axis of said first hinge means between open and closed positions approximately 180° of relative rotation, second hinge means on the opposite marginal edge of one of said panels for pivotal anchoring coaction with the ship structure about the hatchway along an axis of said second hinge means parallel to said first hinge axis, support means for supporting the free edge of the second of said panels for movement across the hatchway, an actuating linkage assembly operatively connected to said first hinge means for actuating the panels between said open and closed positions, and drive means mounted on one of the panels including a reciprocating jack screw and a motor, the jack screw being connected to said actuating linkage assembly and drivingly coupled to said motor.

2. An electro-mechanical self-powered folding cover in accordance with claim 1, wherein the threaded portion of the jack screw is shielded from contamination over the extent of its travel by surrounding enclosure means.

3. An electro-mechanical self-powered folding cover in accordance with claim 1, wherein the actuating linkage assembly includes a toggle arm having one end pivotally coupled to a confronting marginal edge of one of said panels, a link having one end pivotally coupled to the confronting marginal edge of the other panel, and means pivotally coupling the other end of said link to said toggle arm, the jack screw being pivotally connected to the other end of said toggle arm.

References Cited by the Examiner
UNITED STATES PATENTS

| | | | |
|---|---|---|---|
| 1,795,786 | 3/1931 | Lovett | 114—201 |
| 2,630,720 | 3/1953 | Gambill | 268—74 |
| 2,733,484 | 2/1956 | Jedlicka | 268—74 |
| 2,911,211 | 11/1959 | Umbricht | 268—74 |
| 2,915,137 | 12/1959 | Troche | 182—2 |
| 3,204,720 | 9/1965 | Eitel | 182—2 X |
| 3,220,467 | 11/1965 | Hamilton | 160—188 |

HARRISON R. MOSELEY, *Primary Examiner.*

P. M. CAUN, *Assistant Examiner.*